Patented May 13, 1952

2,596,192

UNITED STATES PATENT OFFICE 2,596,192

DYEING WITH PIGMENT COLORING MATTER

Glenn F. Womble, Danville, Va., assignor to Dan River Mills, Incorporated, Danville, Va., a corporation of Virginia No Drawing. Application May 3, 1947, Serial No. 745,731

10 Claims. (Cl. 117—76)

This invention relates to a method of dyeing with pigment coloring matter as applied from emulsions, dispersions, etc., to obtain products having fast shades of abnormal depth and extreme brilliancy.

Heretofore textile materials dyed with pigment-resin formulations have been limited to comparatively light shades in order to obtain a desirable hand, and prevent excessive crocking. Also, these light shades appear dull or "sad" as compared to vat, azoic, direct or other conventional dyeings.

An object of this invention is to dye textile materials with pigments from resin dispersions, resin solutions, or resin emulsions or other binders, all of which I shall refer to as resin pigment formulations, in such a manner as to obtain products exhibiting extreme brilliancy as compared to the identical application of the same pigment in methods heretofore used.

Another object of this invention is to obtain an increase in depth of shade even up to 100% or more in some cases, with the same amount of pigment as has been applied in conventional methods.

Another object is to acquire fast union shades on mixed materials such as, for example, cotton and viscose rayon, cotton and cellulose acetate, viscose rayon and cellulose acetate, and many others that heretofore have been impossible to union dye without extreme cost and many hazardous degradating effects; this union dyeing being obtained simultaneously with the objectives in the foregoing paragraphs.

I have obtained a most unexpected result in the application of resin-pigment formulations by pretreating the material with certain resins and/or chemicals. An important fact is that many of my pretreating materials have been extensively used to obtain various effects such as crease proofing, shrinkage control, mildew proofing, improvement in hand, etc. The pretreatment of textiles or other similar materials to obtain these novel dyeing effects is accomplished by impregnating the textiles with (1) resin condensates in the monomeric or partially polymerized form, or (2) with reacting chemicals such as formaldehyde, glyoxal, etc.; along with suitable catalysts, if needed, and heating them to polymerize or react. Now by these pretreating steps, directly in opposition to the effect of dyeing with solutions of dyestuffs ordinarily applied to textile materials, I obtain an increased depth of shade and increased brilliancy which is proportional to the solid polymerized resin content within the fibres or extent of reaction on the fibres by suitable chemicals when applying pigments on the pretreated materials. If a pretreatment with these resins or other reacting chemicals were used with textile fabrics to be dyed with dyestuffs in the soluble form, e. g., directs, vats, sulfurs, naphthols, etc., it would cause partial or complete immunization, depending upon the quantity of solid polymerized resin present or extent of reaction (I am aware of the fact that certain acid colors have an affinity for certain resins when applied to textile materials, but in this case the coloring matter is applied as a solution, with the resin acting as a mordant), that is, with dyes that have no affinity for resins or reacted fibres or filaments the more resin applied and polymerized in the fabric the weaker the shade of dyeing, eventually reaching immunization.

The pretreatment step in my novel dyeing process can be utilized for crease-proofing, shrinkage setting, and other stabilizing and desirable factors as prerequisites for the dyeings as described. Such crease-proofing treatments are normally applied as a finishing step after any form of dyeing, but I have found that these treatments make an ideal base for my novel resin-pigment steps.

Aside from the increased depth and brilliancy of shade on a material constructed of a single fibre of filament, e. g., all rayon, all cotton, all acetate, etc., I find that in a mixed fabric of fibres that ordinarily dye wth a differential depth of shade, if dyed by my process, will be dyed to an equal depth or almost equal depth of shade, thereby obtaining a solid or union dyeing. Due to more surface deposition of the pretreating resins on materials that ordinarily dye to a less degree, they in turn dye deeper in proportion to pigment pick-up than accompanying fibres that swell more in aqueous solution, thus giving unexpected dyeing of equal depth as an overall coloration (nylon, acetate, etc.). These union dyeing effects are accomplished without the usual complicated procedure and degrading effects hitherto required for union dyeing of fast colors, and at the same time acquire more depth and brilliancy of shade.

Contrary to normal expectations, if "pretreatment" resin condensates are applied together with the pigment-resin formulations as a one-step process or even after a resin-pigment dyeing, there is obtained no beneficial effect of increased color value, increased brightness or union dyeing effects.

Some of the reacting chemicals and resin condensates I have found to give satisfactory results when used as pretreatment for resin-pigment applications are: Phenol-formaldehyde, ketone-aldehyde, urea-formaldehyde, melamine-formaldehyde, dimethyl ether of dimethylol urea, hexamethyl ether of hexamethylol melamine, formaldehyde, and glyoxal.

It is believed that the reason for increased brilliancy, and equality of shade in mixed fibres, is due chiefly to a deposition of pigment coloring matter around the pretreated individual fibres or filaments being dyed, the pretreating of the individual fibres or filaments determining the refraction, absorption and reflection of the incident light falling upon the surface of the fabric. Supporting the evidence of deposition of pigment coloring matter around the fibres or filaments instead of within when applied to fabrics, a resin pretreated swatch of material was spotted from a medicine dropper with an oil-in-water emulsion of resin-pigment. The spot spreads or dilates itself much more than when the same formulation is dropped on the same material untreated. Presuming an identical area of material will be covered in both cases (i. e., in one case the resin-pigment formulation penetrated the fibres, coloring an area hidden from the eye and in the other case more surface area was covered) it is obvious that fibres were penetrated to a greater degree in case of the untreated material. Supporting the evidence of alteration of the angle of reflection of light, etc., is cited the effect produced by water or oil on any colored fabric which is capable of being wet by them, is analogous. While wet the color is deeper and more brilliant. In confirmation of this, it is noted that, if a fabric treated with a sufficient amount of resin by my invention is compared with the same fabric treated with the same amount of pigment by the usual method, the former as described above is much deeper and more brilliant in shade. If now, both samples were wetted, the depth and brilliancy of the conventional sample is increased while that of the other remains practically the same.

Not only have I acquired extra depth from a normal pigment dyeing, but most astounding I have obtained with Monastral Blue and Monastral Green, dyeings with brilliancy comparable to basic dyestuffs. To my knowledge, no fast-to-light, fast-to-washing, fast-to-bleaching shades of such intense brilliancy have heretofore ever been obtained by a practical method.

These novel dyeing effects are applicable to fabrics, yarns and similar materials capable of being pretreated with certain synthetic resins or reacting chemicals such as formaldehyde, glyoxal, etc., which are subsequently polymerized or reacted and over-dyed with resin-pigment dye formulations.

I have over-dyed resin-treated materials with oil-in-water emulsions of pigments and resins, water dispersions of pigments, water dispersions of pigments in oil-in-water emulsions of resins, and in each case have obtained unusual and unexpected results.

In order to best describe the steps of my invention, and the products resulting therefrom, I am herewith setting forth in detail examples of pretreatment and dyeing.

NOTE: All fabrics and other materials used in carrying out the following examples were prepared for dyeing by the conventional method suitable for the particular material being processed, i. e., rendered clean, absorbent, etc.

All dyeings were made at room temperature by passing materials through an immersion "Microset" laboratory padder, dried, and cured for 3 to 5 minutes in a hot air oven at 150° C. to 160° C., soaped at the boil and finally dried.

The percentages of dyes specified in all examples are based upon weight of total volume of padding formulation.

EXAMPLES OF METHODS OF PRETREATMENT

1. *Melamine-formaldehyde resin condensate*

Goods prepared for dyeing are impregnated on an immersion padder allowing a pick-up of approximately 75% with an aqueous solution of Resloom HP (melamine formaldehyde resin) as manufactured by Monsanto Chemical Co., along with 5% of catalyst HP (zinc chloride) based on weight of Resloom HP in formulation and 2% by volume of Surfax WO (sulphonated fatty ester); dried, then cured to polymerize resin, in a hot air oven at 150° C., to 160° C. for three to five minutes.

2. *Urea-formaldehyde resin condensate*

Goods prepared for dyeing are impregnated on an immersion padder allowing a pick-up of approximately 75%, with an aqueous solution of dimethylol urea, along with 3% of diammonium phosphate, based on weight of resin, as catalyst; dried, then cured for three to five minutes at a temperature of 150° C. in a hot air oven.

3. *Ketone-aldehyde resin condensate*

Goods prepared for dyeing are impregnated on an immersion padder allowing a pick-up of approximately 75% with an aqueous solution of Beckamine P-468 (an acetone-formaldehyde condensate) along with 2% sodium carbonate as catalyst based on weight of total volume of formulation; dried, then cured three minutes at 150° C. in a hot air oven (soaped to remove decomposition products, and finally dried).

4. *Formaldehyde*

Goods prepared for dyeing are impregnated on an immersion padder allowing a pick-up of approximately 75%, with an aqueous solution of formalin, along with 1% of oxalic acid (based on weight of total volume) as catalyst; dried at 120° C., cured in a hot air oven at 170° C. for one minute, soaped and finally dried.

5. *Glyoxal*

Goods prepared for dyeing are impregnated on an immersion padder, allowing a pick-up of approximately 75%, with an aqueous solution of glyoxal, along with .8 oxalic acid (based on weight of total volume) as catalyst, aged for a few minutes; dried, then cured for three to five minutes in a hot air oven at 150° C. to 160° C., chlorine bleached to clear up yellow coloration, anti-chlored, rinsed and dried.

EXAMPLES OF DYEING

Example No. 1

A fabric, the body of which was constructed of plied yarns of cotton and spun viscose rayon (i. e., 50% of each) in warp and filling, decorated with a large check of all-cotton yarns enclosing a smaller check of all spun viscose rayon yarns, was treated with a 20% solution of dimethylol urea as described in Method of Pretreatment #2. This treated fabric along with an untreated portion of the same fabric was then impregnated through an immersion padder with an oil-in-water emulsion of 6 ccs. per liter of commercial ammonia, .5 gm. per liter of sodium alginate and 10% Sherdye Blue G2W (a resin-pigment concentrate) both fabrics picking up approximately 75% of formulation, dried, cured three minutes at 150° C., soaped at the boil for two minutes, rinsed and finally dried. The resin-treated swatch dyed a union shade on both cotton and rayon approximately twice as heavy and much more brilliant than the untreated swatch. The checkered pattern was dyed solid and imperceptible on the resin-treatment swatch, while on the untreated swatch the check of all-cotton yarns was dyed very lightly exhibiting a prominent, almost white, checker design.

Example No. 2

A fabric of "butcher linen" design composed of 80% viscose rayon staple and 20% cotton decorated with a small black check woven of vat dyed yarns, was treated with 20% solution of dimethylol urea as described in Method of Pretreatment #2. A swatch of this treated fabric along with an untreated portion of the same fabric was impregnated through an immersion padder with an oil-in-water emulsion of 5% Sherdye Pink S2W (a resin-pigment concentrate), 6 ccs. per liter of commercial ammonia and .5 gm. per liter of sodium alginate; both fabrics picking up approximately 80% of its own weight of the formulation, dried, cured three minutes at 150° C., soaped at the boil two minutes, rinsed and finally dried. The resin treated swatch dyed a uniform shade much heavier and brighter than the untreated swatch of material which not only dyed much lighter, but displayed an uneven effect due to the cotton portion of the fabric dyeing lighter than the viscose rayon portion.

Example No. 3

A fabric constructed of a cotton yarn plied with spun viscose yarns, in both warp and filling (i. e., 50% cotton and 50% viscose rayon), was treated with 25% dimethylol urea as described in Method of Pretreatment #2. This treated fabric, along with a portion of the same fabric untreated, was then impregnated through an immersion padder with the following formulation of an aqueous dispersion of pigment in an aqueous solution of resin monomer (each fabric picking up approximately 70% of its own weight of the formulation):

40 gms. per liter Aridye SX Brown R, a pigment dispersion
56 gms. per liter Resloom HP (Monsanto Chemical Co.)
2.8 gms. per liter catalyst HP
0.5 gm. per liter sodium alginate The formulation was prepared by dissolving Resloom HP in water at about 40° C. and adding catalyst; this solution, along with the solution of sodium alginate was then added with stirring into the water dispersion of pigment and enough water added to bring volume to one liter. The formulation was then strained through cotton cloth and added to immersion padder. After impregnating on padder the swatches were dried, cured for three minutes at 150° C. in oven, soaped at boil for one minute, rinsed and finally dried. The resin-treated swatch dyed a shade of brown approximately twice as heavy as the untreated portion of material.

Example No. 4

The same fabric as used in Example No. 3 was treated with 5% solution of Beckamine P-468 as described in Method of Pretreatment No. 3. Swatches of both treated and untreated material were impregnated simultaneously through an immersion padder with the same resin-pigment formulation used in Example No. 1. The resin-treated swatch dyed approximately 100% heavier and more brilliant than untreated portion of fabric.

Example No. 5

A fabric constructed of a blend of 50% cellulose acetate and 50% spun viscose rayon was treated with a 15% solution of dimethylol urea as described in Method of Pretreatment No. 2. Swatches of this material both treated and untreated were padded on an immersion padder with a pick-up of approximately 65% of an oil-in-water emulsion of 50 gms. per liter of Sherdye Green G2W (a resin-pigment concentrate), 6 ccs. per liter of commercial ammonia and .5 gm. per liter of sodium alginate. Both swatches were dried, cured three minutes at 150° C. in a hot air oven, soaped, rinsed and finally dried. The treated swatch dyed a solid shade approximately twice as heavy as the untreated portion of the same material. Not only did the untreated portion dye about half as heavy as the treated portion, but the acetate component of the blended material was only stained, exhibiting a heather effect.

Example No. 6

The same fabric as used in Example No. 3 was treated with 50% volume of formalin as described in Method of Pretreatment No. 4. Swatches of both, pretreated and untreated material impregnated simultaneously through an immersion padder with an oil-in-water emulsion of Sherdye Blue G2W, dried, cured three minutes at 150° C., soaped at the boil, rinsed and finally dried. The formaldehyde treated swatch dyed much heavier, brighter and more uniform than untreated swatch.

Example No. 7

The same fabric as used in Example No. 3 was treated with 15% glyoxal as described in Method of Pretreatment No. 5. Swatches of both pretreated and untreated materials were padded through the same formulation as used in Example No. 1. The pretreated portion dyed approximately 50% heavier and more brilliant than untreated material.

Example No. 8

Unmercerized peroxide bleached cotton twill was pretreated with 20% dimethylol urea as described in Method of Pretreatment No. 2. A swatch of this treated fabric, along with a portion of untreated material of the same construction, was impregnated through an immersion padder with an oil-in-water emulsion of 5%

Sherdye Blue G2W, 6 ccs. per liter of commercial ammonia and .5 gm. per liter of sodium alginate, dried, cured for three minutes at 150° C., soaped at the boil, rinsed and finally dried. The resin treated swatch dyed approximately 75% heavier, more brilliant and smoother than the untreated swatch.

*Example No. 9*

A fabric of "tropical worsted" design constructed of all spun nylon cut staple was treated with a 10% solution of dimethylol urea as described in Method of Pretreatment No. 2. This treated fabric along with an untreated portion of the same fabric was impregnated through an immersion padder with the same resin-pigment formulation used in Example No. 1. The resin-treated swatch dyed a very brilliant shade of blue while the untreated portion dyed a light dull shade of blue.

*Example No. 10*

The same fabric design used in Example No. 3 was pretreated with a 10% solution of Resloom HP as described in Method of Pretreatment No. 1. Swatches of both treated and untreated materials were impregnated through an immersion padder with an oil-in-water emulsion of 6 ccs. per liter of commercial ammonia, .5 gm. per liter of sodium alginate and 5% Sherdye Brown BC2W. Then both samples were dried, cured at 155° C. for 2½ minutes, soaped and finally dried. The treated swatch was dried considerably heavier than untreated swatch.

*Example No. 11*

The same fabric as used in Example No. 5 was treated with 5% of Beckamine P-468 as described in Method of Pretreatment No. 3. Portions of both treated and untreated materials were pigment dyed with the same formulation used in Example No. 1. The treated portion dyed approximately twice as deep in shade as the untreated, and was a much more uniform and brilliant shade of blue.

*Example No. 12*

A spun cellulose acetate fabric of "butcher linen" construction was pretreated as fabric in Example No. 2. Swatches of treated and untreated materials were dyed with the same formulation as Example No. 1. The treated swatch dyed approximately twice as heavy with considerably more brilliancy.

*Example No. 13*

An all wool fabric of flannel design was impregnated with a solution of .25% Surfax WO (wetting agent) and 20% dimethylol urea, dried, cured, etc. as Method of Pretreatment No. 2. A swatch of same fabric was impregnated with .25% Surfax WO and dried for untreated swatch. Both swatches were then dyed with same dye formulation used in Example No. 1. The swatch containing .25% Surfax WO only dyed a light dull shade of blue while the resin-treated swatch dyed a brilliant shade of blue about twice as heavy.

*Example No. 14*

Boiled-out bleached 8/2 cotton yarn was impregnated through an immersion padder with 25% solution of dimethylol urea as described in Method of Pretreatment No. 2. The resin-treated yarn, along with an equal length of untreated yarn, was dipped in an immersion pad box containing same formulation used in Example No. 1, squeezed to remove excess formulation, dried, cured for five minutes at 150° C., soaped and finally dried. The pretreated yarn dyed a much heavier and more brilliant shade of blue than did the untreated yarn.

*Example No. 15*

A strip of ordinary white blotting paper was impregnated with a 20% solution of dimethylol urea as described in Method of Pretreatment No. 2. This treated portion of paper along with an untreated portion was passed through an immersion padder and so impregnated with the same dye formulation as used in Example No. 1. The treated portion of paper dyed considerably more brilliant and heavier than the untreated portion.

It will thus be seen from the above examples that with a minimum of operations I am able to obtain stabilization, crease-proofing, etc., of fabrics, and at the same time obtain dyeings of abnormal depth and brilliancy. The color value for a given amount of pigment is increased as much as or even more than 100%. The depth and brilliancy of dry materials treated by my process can be made comparable to the depth and brilliancy obtained by immersing the dyed untreated materials in water.

The results obtained are so outstanding that in some cases it will be found economical and highly desirable to pretreat the material by the above-mentioned resin treatments, simply to obtain the valuable effect of increased brilliancy, depth of shade or uniformity of dyeing.

It will be understood that variations in squeeze, pick-up, time, and temperature of curing resins or reacting chemicals, can be made without departing from scope of the invention.

I claim:

1. The process of increasing the depth and brilliance of resin-pigment dyed textile material when dry, which comprises pretreating the individual fibers of the material with an unpigmented water-soluble thermosetting resin which will seal the interstices and capillary spaces of the individual fibers without closing the interstices of the material itself and thereby hold substantially all the resin-pigment on the surface of the individual fibers, curing the resin, and subsequently applying the resin-pigment on the fabric.

2. The process of increasing the depth and brilliance of resin-pigment dyed material when dry, which comprises pretreating the textile material with an unpigmented water-soluble aldehyde base resin which seals the discrete fibers against impregnation by resin-pigments, curing the resin on the fabric, and then coating the surface of the discrete resin treated fibers with resin-pigment carried in an oil-in-water type emulsion.

3. The process of increasing the depth and brilliance of resin-pigment dyed material when dry, which comprises pretreating the textile material with an unpigmented water-soluble aldehyde base resin, curing the resin, and then coating the surface of the discrete resin treated fibers with resin-pigment.

4. The process of increasing the depth and brilliance of, and union dyeing, resin-pigment dyed mixed textile material, which comprises impregnating the individual fibers of the textile material with an unpigmented water-soluble thermosetting resin which renders the discrete fibers substantially non-absorbent and impermeable to resin-pigments without closing the interstices of the material itself, curing the resin and then coating the surface of the discrete resin treated fibers with resin-pigment.

5. The art of treating textile materials having discrete fibers, which comprises impregnating the discrete fibers with an unpigmented intermediate water-soluble resin condensate of formaldehyde, curing the resin, and then dyeing with a resin-pigment dye formulation.

6. The process of increasing the depth and brilliance of resin-pigment dyed textile material, without increasing the amount of resin-pigment normally used in dyeing the same piece of material, which comprises treating the discrete fibers of the textile material with an unpigmented water-soluble thermosetting resin which renders the discrete fibers substantially non-absorbent and impermeable by resin-pigments without closing the interstices of the material itself, curing the material, coating the surface of the discrete resin treated fibers with an oil-in-water resin-pigment formulation, and then drying and curing to form resin-bonded pigment layers on the surfaces of the discrete fibers.

7. The process of increasing the depth and brilliance of resin-pigment dyed textile material, without increasing the amount of resin-pigment normally used in dyeing the same piece of material, which comprises treating the discrete fibers of the textile material with an unpigmented water-soluble thermosetting resin which renders the discrete fibers substantiallly non-absorbent and impermeable by resin pigments without closing the interstices of the material itself, subsequently curing the material, coating the surface of the discrete resin treated fibers with a resin-pigment formulation, and then drying and curing to form resin-bonded pigment layers on the surfaces of the discrete fibers, the layer of pigment-resin on the surfaces of the discrete fibers being very thin so as not to materially change the hand of the material, and removing the resin-pigment, if any, from between the fibers.

8. A resin-pigment dyed textile material, the color of which is relatively deep and brilliant having an inner unpigmented layer of the polymerization product of a water-soluble thermosetting resin on the discrete fibers of the material, the discrete fibers having a thin layer of resin-pigments over said thermosetting resin layer.

9. A resin-pigmented dyed textile material, the discrete fibers of which, contain the substantially colorless polymerized water-soluble thermosetting resin, and an outer coating of resin-pigment on the discrete fibers.

10. The process of increasing the depth and brilliance of resin-pigment dyed textile materials which comprises pretreating discrete fibers of said materials with a substantially colorless water-soluble aldehyde base resin, without appreciably affecting the porosity of the material, curing by heating in the presence of a catalyst, superficially dyeing with a resin-pigment coloring matter, drying and heating said coloring matter to attach the same to the surface of the discrete fibers.

GLENN F. WOMBLE.

REFERENCES CITED

The following references are of record in the file of this patent:

UNITED STATES PATENTS

| Number | Name | Date |
| --- | --- | --- |
| 2,071,419 | Moss | Feb. 23, 1937 |
| 2,131,777 | Willcox | Oct. 4, 1938 |
| 2,185,746 | Goencz et al. | Jan. 2, 1940 |
| 2,385,320 | Greene et al. | Sept. 18, 1945 |
| 2,385,765 | Thurston | Sept. 25, 1945 |
| 2,423,428 | Pollard | July 1, 1947 |
| 2,424,284 | Olpin et al. | July 22, 1947 |
| 2,444,468 | Powers | July 6, 1948 |
| 2,453,752 | La Piana | Nov. 16, 1948 |
| 2,474,909 | Olpin et al. | July 5, 1949 |
| 2,488,397 | Hall | Nov. 15, 1949 |

FOREIGN PATENTS

| Number | Country | Date |
| --- | --- | --- |
| 265,334 | Great Britain | Feb. 10, 1927 |
| 452,435 | Great Britain | Aug. 21, 1936 |
| 460,201 | Great Britain | Jan. 22, 1937 |
| 484,691 | Great Britain | of 1938 |
| 518,167 | Great Britain | Feb. 20, 1940 |
| 547,846 | Great Britain | Sept. 15, 1942 |